May 29, 1962 R. W. KERR 3,036,809
HYDRAULIC DIVERTER FOR RESERVE PRESSURE CYLINDERS
Filed Aug. 9, 1957
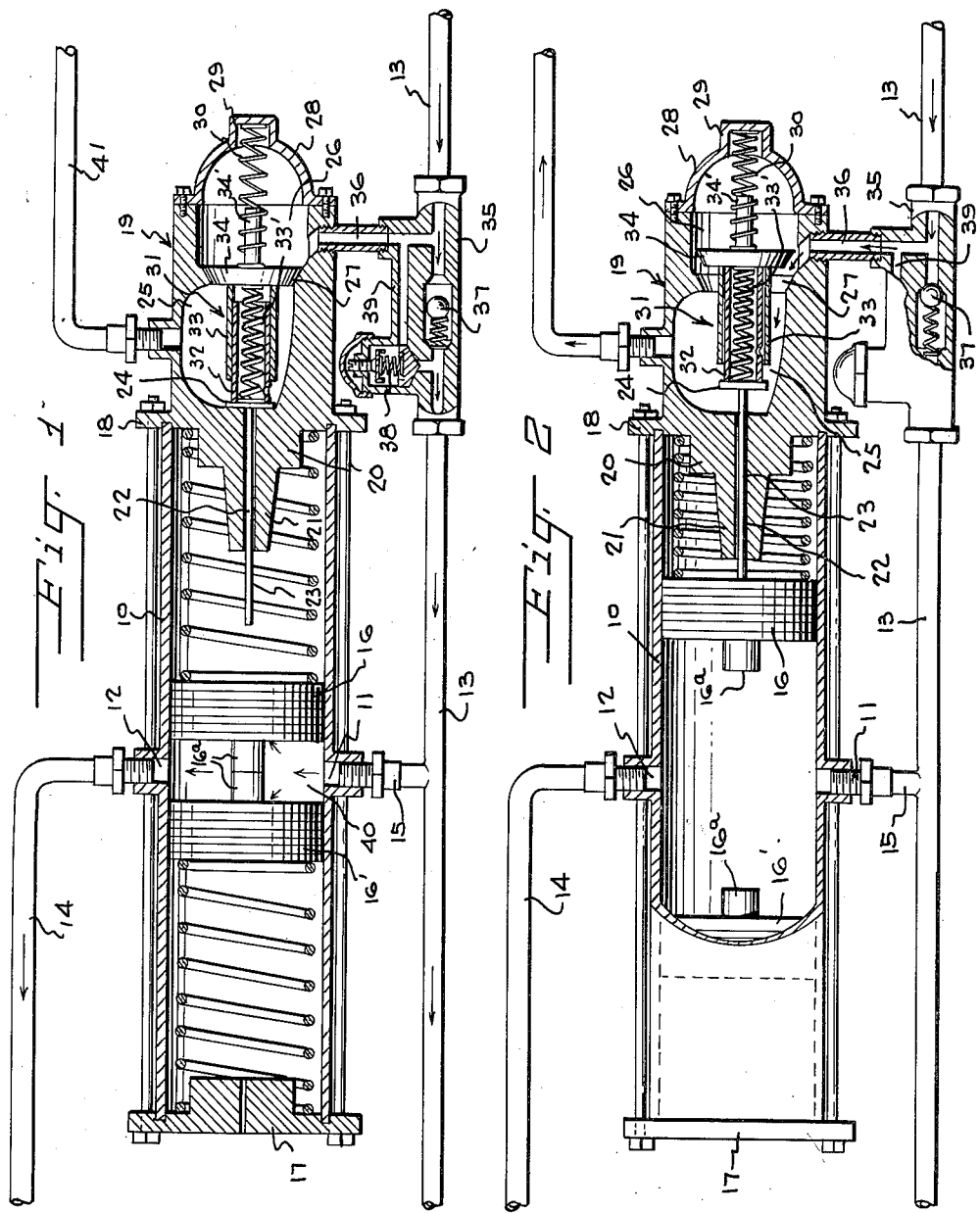
INVENTOR
Ralph W. Kerr
BY Christian P. Nielsen
ATTORNEY United States Patent Office 3,036,809
Patented May 29, 1962

3,036,809
HYDRAULIC DIVERTER FOR RESERVE
PRESSURE CYLINDERS
Ralph W. Kerr, Bowman, N. Dak.
Filed Aug. 9, 1957, Ser. No. 677,398
1 Claim. (Cl. 251—77)

This invention relates to a hydraulic diverter for use in conjunction with reserve pressure cylinders and it consists in the constructions, arrangements and combinations herein described and claimed.

It is a particular object of the invention to provide a hydraulic diverter for use in conjunction with a reserve pressure cylinder such as shown and described in my Patent No. 2,789,581, issued April 23, 1957, whereby hydraulic fluid may be supplied to the reserve pressure cylinder under pressure or diverted into a return line to the source of supply under little or no pressure.

A still further object of the invention is the provision of a fluid diverter which may be incorporated in a reserve pressure cylinder thereby providing a unit that will provide a reserve of hydraulic pressure and still retain the advantages of a constant flow system in which the hydraulic fluid may flow at all times, normally under very little pressure.

It is also an object of the invention to provide a hydraulic diverter which is of simple construction, of few parts which are readily assembled, dissembled for repair or adjustment.

Additional objects, advantages and features of invention will be apparent from the following description considered in conjunction with the accompanying drawing wherein, FIGURE 1 is a longitudinal section through a reserve pressure cylinder having the diverter installed, the control valve of which is in closed position.

FIGURE 2 is a similar view with the control valve in open position.

There is illustrated a hydraulic reserve pressure cylinder 10 which may be of any desired length and diameter depending upon the type of hydraulic system upon which it is employed.

Intermediate the length of the cylinder 10 an inlet port 11 is formed and diametrically opposite thereto an outlet port 12 is provided, these ports being interiorly threaded to receive fluid conducting pipes 13 and 14 respectively, the pipe 13 having a branch extension 15 connected to the inlet 11 of the cylinder 10. The pipe 13 is connected to control valves or selector valves (not shown) or other devices where instant pressure is desired, which is likewise true of the pipe 14.

The cylinder 10 is open at the ends for assembly of a pair of pistons 16 and 16′, one end of the cylinder 10 being closed by a head 17, while the other end is closed by a flange 18 of the diverter housing 19, the flange 18 having an axially located boss 20 positioned within the cylinder, the latter including a reduced extension 21, the boss and extension having a bore 22 for guiding a valve operating stem 23 which is provided with a flange 24 positioned within a rearmost chamber 25 formed in the diverter housing 19, which is also provided with a foremost chamber 26 in alignment therewith, and between these two chambers a valve seat 27 is formed. The chamber 26 is provided with a spherical closure cap 28 in the medial portion of which a seat 29 is formed for a helical spring 30.

The diverter includes a valve assembly 31 which consists of a pair of telescopic tubes 32 and 33 having an interposed spring 33′. The tube 32 is mounted upon the flange 24, while the tube 33 has a valve 34 fixed to the outer end thereof which is complemental to the valve seat 27, the valve 34 further having an extension 34′ encompassed by the spring 30.

The pipe 13 which is connected to a pump (not shown) has a fitting 35 having a pipe connection 36 opening upon the chamber 26 and forwardly of the pipe 36, the fitting 35 has a check valve 37 as well as a relief valve 38 for venting fluid through a port 39 which is in communication with the pipe 36, which may be required due to variations in pressure or temperatures of the hydraulic fluid.

The pistons 16 and 16′ are constructed in accordance with my aforesaid patent and include opposed medial abutments 16a which in normal position are in abutting relation forming a chamber 40 between said pistons, as shown in FIGURE 1.

The operation of the diverter is substantially as follows:

Hydraulic fluid from the pump of the system flows through pipe 13, opening the check valve 37 admitting fluid into the pressure reserve cylinder 10 through inlet 11 and when pressure has been built up between the pistons 16 and 16′ the pistons will be forced apart, the piston 16 engaging the stem 23 moving sleeve 32 so as to compress the spring 33′ and thus unseating valve 34 which releases pressure into chamber 25. Reduction of pressure in chamber 26 permits the check valve 37 to close which will retain a volume of fluid under pressure in the reserve pressure cylinder, yet allowing free flow of fluid from the pump line 13 into chamber 26 through line 36, the fluid from chamber 26 passing into chamber 25 and pass from this chamber by way of the hydraulic return line 41 to the source of supply.

When the stem 23 starts to open valve 34, the movement of the piston 16 will stop by virtue of the release of pressure behind the valve and the spring 33′ being of greater strength than the opposing spring 30, the valve 34 will open further allowing for admission of a greater circulating fluid. When fluid pressure is drawn from the reserve pressure cylinder 10, the piston 16 will move away from the stem 23, allowing spring 30 to close valve 34, thus trapping fluid and forcing it through check valve 37 when the cycle may be repeated.

It is a further function of the spring 33′ to effect a proper closing of valve 34. That is, if only enough fluid is drawn from pressure reserve cylinder 10 the valve 34 is almost closed and causes some pressure in chamber 26. When pressure begins to accumulate it will exert pressure on valve 34 and compress spring 33′, closing valve 34 thereby forcing pressure fluid into reserve cylinder 10 until piston 16 pushes valve stem 23 to cause valve 34 to be fully opened. Consequently, the reserve cylinder will always be full and valve 34 will always be fully opened to allow pressure free flowing of fluid.

While I have shown and described a preferred form of the device, this is by way of illustration only and I consider as my own all such modifications in construction as fairly fall within the scope of the appended claim.

I claim:

A fluid diverter for a reserve pressure cylinder comprising a housing having a securing flange, said flange having an axial extension, said extension having a longitudinally extending bore, a valve operating stem slidably mounted in said bore and projecting beyond the inner end of said extension, said diverter housing further having a foremost and a rearmost aligned fluid receiving chamber, a valve for controlling passage of fluid between said chambers, a sleeve on said valve operating stem, said valve having a sleeve telescopically receiving said first named sleeve, a helical spring within the first sleeve extended between said valve operating stem and said valve, said valve having an axial extension in opposed relation to said helical spring, a helical spring encompassing said axial extension, one end of which is engaged in a seat formed in the diverter housing in alignment with the axial extension of the valve, said first named spring being of greater strength than the second named spring and said foremost chamber having communication with the inlet to said foremost chamber.

References Cited in the file of this patent

UNITED STATES PATENTS

| | | | |
|---|---|---|---|
| 1,373,599 | Clark | Apr. 5, | 1921 |
| 2,174,797 | Magnuson | Oct. 3, | 1939 |
| 2,264,375 | Hill et al. | Dec. 2, | 1941 |
| 2,375,411 | Grant | May 8, | 1945 |
| 2,474,122 | Schenk | June 21, | 1949 |
| 2,789,581 | Kerr | Apr. 23, | 1957 |
| 2,791,229 | Pasco | May 7, | 1957 |
| 2,872,149 | Battey | Feb. 3, | 1959 |